United States Patent

Matsumura et al.

[11] Patent Number: 5,935,311
[45] Date of Patent: Aug. 10, 1999

[54] WATER-RESISTANT INK COMPOSITION AND WRITING INSTRUMENT

[75] Inventors: Kazuyuki Matsumura; Masanao Kamei; Fujio Yagihashi, all of Gunma-ken; Koji Kawashima, Wakayama-ken, all of Japan

[73] Assignee: Shin-Etsu Chemical Co., Ltd., Japan

[21] Appl. No.: 09/015,919

[22] Filed: Jan. 30, 1998

[30] Foreign Application Priority Data

Jan. 30, 1997 [JP] Japan ................................. 9-031328
Jan. 30, 1997 [JP] Japan ................................. 9-031329

[51] Int. Cl.⁶ .................................................. C09D 11/02
[52] U.S. Cl. ..................................... 106/31.43; 106/31.75
[58] Field of Search ............................... 106/31.43, 31.75

[56] References Cited

U.S. PATENT DOCUMENTS

| | | | |
|---|---|---|---|
| 3,453,248 | 7/1969 | Gowdy et al. | 260/79.5 |
| 4,045,397 | 8/1977 | Parkinson | 260/29.3 |
| 4,684,697 | 8/1987 | Chang et al. | 525/100 |
| 5,068,277 | 11/1991 | Vukov et al. | 524/441 |
| 5,693,127 | 12/1997 | Nigam et al. | 106/31.43 |
| 5,827,361 | 10/1998 | Bernhardt et al. | 106/415 |

FOREIGN PATENT DOCUMENTS

| | | |
|---|---|---|
| 0 011 782 | 6/1980 | European Pat. Off. . |
| WO 95/31511 | 11/1995 | European Pat. Off. . |
| 44 19 706 | 12/1995 | Germany . |
| 060349 | 3/1998 | Japan . |

*Primary Examiner*—Helene Klemanski

*Attorney, Agent, or Firm*—Millen, White, Zelano & Branigan, P.C.

[57] ABSTRACT

A water-resistant ink composition comprising:

(I) 10 parts by weight of a water-soluble dye compound and/or organic pigment compound;

(II) 2 to 60 parts by weight of an organosilicon compound which is obtained from a mixture of components (A) and (B) shown below by hydrolysis in water or in an organic solvent containing more water than necessary for hydrolysis, (A) 100 parts by weight of a hydrolyzable silane having a nitrogen-containing organic group represented by the following formula (1):

$$YR^1_m SiR^2_{3-m} \qquad (1)$$

wherein $R^1$ is a $C_{1-8}$ unsubstituted or substituted monovalent hydrocarbon group containing no nitrogen atom, $R^2$ is a $C_{1-4}$ alkoxyl group or acyloxy group, Y is a nitrogen-containing organic group, and m is 0 or 1, or a partial hydrolyzate thereof and (B) 5 to 200 parts by weight of a hydrolyzable silane represented by the following formula (2):

$$R^3_n SiR^4_{4-n} \qquad (2)$$

wherein $R^3$ is a $C_{1-8}$ unsubstituted or substituted monovalent hydrocarbon group containing no nitrogen atom, $R^4$ is a $C_{1-4}$ alkoxyl group or acyloxy group, and n is 0, 1, or 2, or a partial hydrolyzate thereof, and (III) 30 to 10,000 parts by weight of water.

6 Claims, No Drawings

WATER-RESISTANT INK COMPOSITION AND WRITING INSTRUMENT

BACKGROUND OF THE INVENTION

1. Field of the Invention

The present invention relates to an ink composition suitable for recording with aqueous ink, especially for ink-jet printing. More particularly, the present invention relates to a water-resistant ink composition superior in water resistance, storage stability, ink delivery stability, and color development. The ink composition does not run even if exposed to wet once it has been printed and dried.

The present invention also relates to a writing instrument (such as ball-point pen, sign pen, marker pen, felt pen, and fountain pen) that employs aqueous ink. More particularly, the present invention relates to a writing instrument with a water-resistant ink composition which does not run even if exposed to wet once it has been written and dried.

2. Description of the Prior Art

The recent growing social interest in environmental protection has stimulated the switching over from solvent-based paints, coating materials, and dyes to water-based ones. This holds true of writing instruments which are used mostly in offices and homes where safety precedes.

For this reason, "aqueous" ball-point pens and "aqueous" ink for fountain pens have recently appeared on the market. These writing instruments need water resistance because they are used in places where water, coffee, juice, etc. are habitually had. There are few ware-resistant aqueous inks on the market. Although some claim to be water resistant, they easily run if exposed to wet immediately after writing.

A silicone compound has often been used to impart water resistance. It imparts good water resistance when applied from a solvent solution, but it is usually unstable in water. It may be slightly stable under weak acidic conditions but becomes unstable under alkaline conditions. It cannot be used in systems containing an aqueous dye which is usually alkaline.

There is proposed an aqueous composition for surface treatment in Japanese Patent Laid-open No. 279678/1994. It is a hydrolyzate of a reaction product from an aminotrialkoxysilane and an organic compound reactive with its amino group. It may be further reacted with an organometallic compound such as tetraalkoxysilane. Unfortunately, it is poor in water solubility because its amino group, which greatly contributes to water solubility, is blocked by the organic group. Common practice to eliminate this disadvantage is to add an anionic surface active agent as a stabilizer. Such an additive, however, sometimes produces an adverse effect on water resistance when added to aqueous ink. In addition, the solution containing it is not so good in long-term storage stability and unstable under alkaline conditions. Therefore, it is not an effective additive for aqueous ink compositions.

Ink-jet recording uses several methods for delivering ink (recording liquid). One method gives mechanical vibration or displacement to ink by means of electrostatic attraction or piezoelectric motion, thereby producing ink droplets. Another method heats ink to produce ink droplets by utilizing pressure resulting from foaming. Ink droplets thus formed emerge partly or entirely from the nozzle to form characters on paper (or any other recording medium). Ink-jet printing is widely used because of its low noise level, high speed, and capability of multi-color printing.

Ink-jet recording usually employs water-based ink for safety and recording characteristics. This ink contains a polyhydric alcohol to prevent nozzle clogging and ensure stable ink delivery.

The recent ink-jet printer with improved performance needs highly sophisticated ink. The most important among characteristic properties required is water resistance because printed matter has a frequent chance of it being wetted by water and beverage in offices and homes where the ink-jet printer is used.

Most of commercial aqueous dye-based ink with good color development lack water resistance almost completely and hence runs when exposed to water. This drawback is due to the fact that the dye itself is soluble in water and the polyhydric alcohol (added to ensure stable ink delivery) is also soluble in water. It is possible but impractical to omit the polyhydric alcohol in order to cope with this situation.

An attempt has been reported to make the dye itself reactive by introduction of alkoxysilyl groups so that it combines with a substrate ("Shikizai" 67 [6] 356–361 (1994)). Unfortunately, this attempt is not so successful because water-soluble dyes have polar groups such as —$SO_3Na$, —$NH_2$, and —CN, which react with alkoxysilyl groups introduced. Resulting products, even if obtained anyhow, are unstable in aqueous solutions and economically unfavorable.

There has been proposed a process for immobilizing a dye on a glass substrate by adding a dye to tetraethoxysilane or methyltriethoxysilane and applying the resulting sol to a glass substrate ("Shikizai" 66 [9] (517–522 (1993)). This idea, however, cannot be used for aqueous ink because the sol immediately becomes gel upon addition to aqueous ink which is usually alkaline.

SUMMARY OF THE INVENTION

It is an object of the present invention to provide an ink composition suitable for ink-jet printing with aqueous ink, said ink composition having such good water resistance that it gives printed images which do not run when wetted by water.

It is another object of the present invention to provide a writing instrument that employs water-resistant aqueous ink.

In order to achieve the above-mentioned object, the present inventors carried out a series of researches which led to the finding that an ink composition composed of the following ingredients (I) to (III) in specific ratio is suitable for writing instruments (such as ball-point pen, sign pen, marker pen, felt pen, and fountain pen) and printers (particularly ink-jet printers) and that said ink composition is superior in water resistance (giving printed images which are completely immune to water), storage stability, stable ink delivery, and color development.

(I) a water-soluble dye compound and/or organic pigment compound;

(II) an organosilicon compound which is obtained from a mixture of components (A) and (B) specified below by hydrolysis in water or in an organic solvent containing more water than necessary for hydrolysis;

(A) 100 parts by weight of a hydrolyzable silane having a nitrogen-containing organic group represented by the following formula (1):

$$YR^1{}_m SiR^2{}_{3-m} \qquad (1)$$

(where $R^1$ is a $C_{1-8}$ unsubstituted or substituted (but not containing nitrogen) monovalent hydrocarbon group, $R^2$ is a $C_{1-4}$ alkoxyl group or acyloxy group, Y is a nitrogen-containing organic group, and m is 0 or 1) or a partial hydrolyzate thereof (B) 5–200 parts by weight of a hydrolyzable silane represented by the following formula (2):

$$R^3{}_n SiR^4{}_{4-n} \qquad (2)$$

(where $R^3$ is a $C_{1-8}$ unsubstituted or substituted (but not containing nitrogen) monovalent hydrocarbon group, $R^4$ is a $C_{1-4}$ alkoxyl group or acyloxy group, and n is 0, 1, or 2) or a partial hydrolyzate thereof (III) water.

The present invention is based on the above-mentioned findings.

According to the first embodiment of the present invention, there is provided a water-resistant ink composition which comprises (I) 10 parts by weight of a water-soluble dye compound and/or organic pigment compound, (II) 2–60 parts by weight of an organosilicon compound which is obtained by hydrolysis from (A) 100 parts by weight of a hydrolyzable silane having a nitrogen-containing organic group or a partial hydrolyzate thereof and (B) 5–200 parts by weight of a hydrolyzable silane or a partial hydrolyzate thereof, and (III) 30–10,000 parts by weight of water.

According to the second embodiment of the present invention, there is provided a writing instrument that employs the above-mentioned water-resistant ink composition as an aqueous ink.

DETAILED DESCRIPTION OF THE INVENTION

Component (I) in the present invention is a water-soluble dye compound and/or organic pigment compound. It is not specifically restricted but is selected from any known color components of aqueous ink to give a black, cyan, magenta, or yellow color.

The water-soluble dye compound includes, for example, yellow dyes (such as acid yellow 17, acid yellow 23, acid yellow 73, and direct yellow 86), magenta dyes (such as acid red 1, acid red 8, acid red 14, acid red 37, acid red 52, acid red 87, acid red 92, acid red 103, acid red 289, and reactive red 4), cyan dyes (such as acid blue 9, acid blue 92, acid blue 87, reactive blue 15, and direct blue 86), and black dyes (such as acid black 2, direct black 22, and direct black 154).

These dyes are usually modified with sodium sulfonate to make them soluble in water. Therefore, most of them are alkaline in aqueous solutions. Such dyes are also acceptable.

Examples of the organic pigment include aniline black, fast yellow, disazo yellow, permanent orange, lysol red, lake red C, permanent red 2B, brilliant carmine 6B, carmine 3B, cobalt violet, methyl violet lake, phthalocyanine blue, fast sky blue, and phthalocyanine green.

Component (II) in the present invention is an organosilicon compound, which imparts water resistance to the ink composition of the present invention. Surprisingly, it is readily soluble in aqueous solution and remains highly stable in alkaline aqueous solution.

As explained above, this organosilicon compound is one which is obtained from a mixture of components (A) and (B) specified below by hydrolysis.

(A) a hydrolyzable silane having a nitrogen-containing organic group represented by the formula (1) below:

$$YR^1{}_m SiR^2{}_{3-m} \qquad (1)$$

(where $R^1$ is a $C_{1-8}$ unsubstituted or substituted (but not containing nitrogen) monovalent hydrocarbon group, $R^2$ is a $C_{1-4}$ alkoxyl group or acyloxy group, Y is a nitrogen-containing organic group, and m is 0 or 1) or a partial hydrolyzate thereof and (B) a hydrolyzable silane represented by the formula (2) below:

$$R^3{}_n SiR^4{}_{4-n} \qquad (2)$$

(where $R^3$ is a $C_{1-8}$ unsubstituted or substituted (but not containing nitrogen) monovalent hydrocarbon group, $R^4$ is a $C_{1-4}$ alkoxyl group or acyloxy group, and n is 0, 1, or 2) or a partial hydrolyzate thereof.

The hydrolyzable silane represented by formula (1) above is one having a nitrogen-containing organic group. It may be used in the form of partial hydrolyzate. They are intended to make the system soluble in water. More than one kind of component (A) may be used.

In formula (1), $R^1$ is an unsubstituted or substituted monovalent hydrocarbon group having 1 to 8 carbon atoms. The unsubstituted monovalent hydrocarbon group includes, for example, alkyl group, alkenyl group, aryl group, and aralkyl group. The substituted monovalent hydrocarbon group includes ones in which some or all of the hydrogen atoms attached to carbon atoms of the unsubstituted monovalent hydrocarbon group are replaced by halogen atoms and the like, such as halogenated alkyl groups, etc. The substituent group does not contain nitrogen atoms. Examples of $R^1$ are —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$ and —$C_6H_{13}$.

In formula (1), $R^2$ is a $C_{1-4}$ alkoxyl group or acyloxy group, which is exemplified by —$OCH_3$, —$OCH_2CH_3$, —$OCH_2CH_2CH_3$, —$OCH(CH_3)_2$, —$OCH_2CH_2CH_2CH_3$, —$OCH(CH_3)CH_2CH_3$, —$OCH_2CH(CH_3)CH_3$, —$OC(CH_3)_3$, —$OCOCH_3$ and —$OCOCH_2CH_3$.

In formula (1), Y is a nitrogen-containing organic group which is represented by formulas (3) to (7) below.

(3)

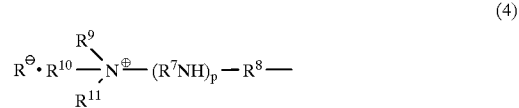

(4)

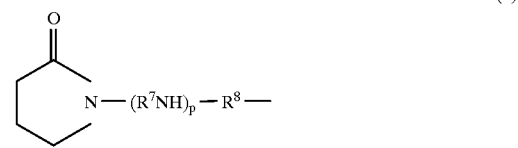

(5)

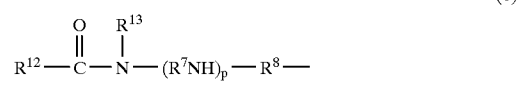

(6)

(7)

wherein $R^5$, $R^6$, $R^9$ to $R^{11}$, $R^{13}$, and $R^{16}$ are each a hydrogen atom or monovalent hydrocarbon group having 1 to 8 carbon atoms, $R^{12}$ is a hydrogen atom, monovalent hydrocarbon group having 1 to 8 carbon atoms or an alkoxyl group having 1 to 8 carbon atoms; $R^5$ and $R^6$, $R^9$ to $R^{11}$, and $R^{12}$ and $R^{13}$ may be identical with or different from each other; R is a halogen atom; $R^7$, $R^8$, $R^{14}$, and $R_{15}$ are each a divalent hydrocarbon group; $R^7$ and $R^8$ and $R^{14}$ and $R^{15}$ may be identical with or different from each other; and p is 0 or an integer of 1 to 3.

The $C_{1-8}$ monovalent hydrocarbon group is the same as that defined as $R^1$. An example of the $C_{1-8}$ divalent hydrocarbon group is an alkylene group.

Examples of the group represented by Y are given below.

$H_2NCH_2CH_2—$,
$H(CH_3)NCH_2CH_2—$,
$H_2NCH_2CH_2CH_2—$,
$H(CH_3)NCH_2CH_2CH_2—$,
$(CH_3)_2NCH_2CH_2CH_2—$,
$H_2NCH_2CH_2NHCH_2CH_2CH_2—$,
$H(CH_3)NCH_2CH_2NHCH_2CH_2CH_2—$,
$(CH_3)_2NCH_2CH_2NHCH_2CH_2CH_2—$,
$H_2NCH_2CH_2NHCH_2CH_2NHCH_2CH_2CH_2—$,
$H(CH_3)NCH_2CH_2NHCH_2CH_2NHCH_2CH_2CH_2—$,
$Cl^-(CH_3)_3N^+CH_2CH_2CH_2—$,
$Cl^-(CH_3)_2(C_6H_5—CH_2—)N^+CH_2CH_2CH_2—$,

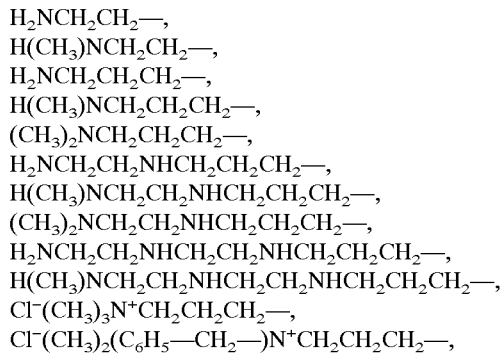

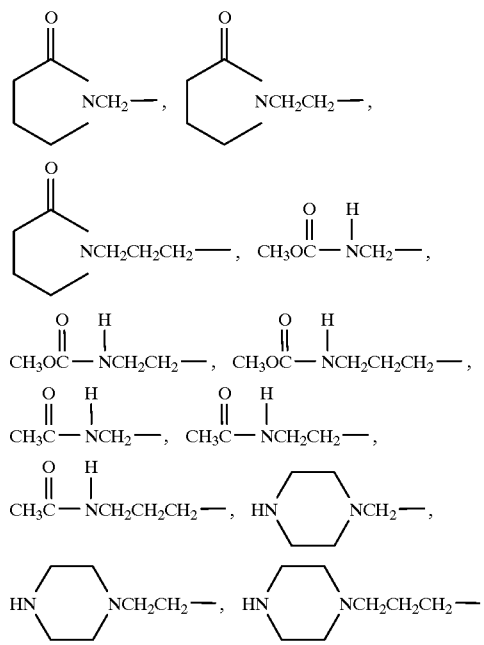

Of these examples, the following are preferable.

$H_2NCH_2CH_2NHCH_2CH_2CH_2—$,
$H_2NCH_2CH_2NHCH_2CH_2NHCH_2CH_2CH_2—$,

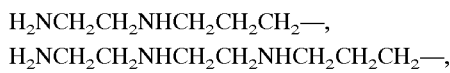

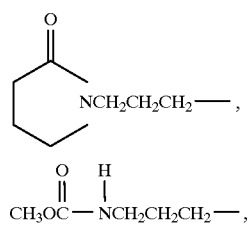

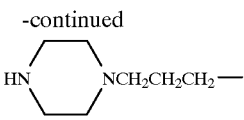

m is 0 or 1, preferably 0.

Formula (1) above represents a hydrolyzable silane (A) having a nitrogen-containing organic group. It is exemplified by the following.

$H_2NCH_2Si(OCH_3)_3$,
$H_2NCH_2Si(OCH_2CH_3)_3$,
$H_2NCH_2SiCH_3(OCH_3)_2$,
$H_2NCH_2SiCH_3(OCH_2CH_3)_2$,
$H_2NCH_2CH_2Si(OCH_3)_3$,
$H_2NCH_2CH_2Si(OCH_2CH_3)_3$,
$H_2NCH_2CH_2SiCH_3(OCH_3)_2$,
$H_2NCH_2CH_2SiCH_3(OCH_2CH_3)_2$,
$H_2NCH_2CH_2CH_2Si(OCH_3)_3$,
$H_2NCH_2CH_2CH_2Si(OCH_2CH_3)_3$,
$H_2NCH_2CH_2CH_2SiCH_3(OCH_3)_2$,
$H_2NCH_2CH_2CH_2SiCH_3(OCH_2CH_3)_2$,
$H(CH_3)NCH_2CH_2CH_2Si(OCH_3)_3$,
$H(CH_3)NCH_2CH_2CH_2Si(OCH_2CH_3)_3$,
$H(CH_3)NCH_2CH_2CH_2SiCH_3(OCH_3)_2$,
$H(CH_3)NCH_2CH_2CH_2SiCH_3(OCH_2CH_3)_2$,
$(CH_3)_2NCH_2CH_2CH_2Si(OCH_3)_3$,
$(CH_3)_2NCH_2CH_2CH_2Si(OCH_2CH_3)_3$,
$Cl^-(CH_3)_3N^+CH_2CH_2CH_2Si(OCH_3)_3$,
$Cl^-(CH_3)_3N^+CH_2CH_2CH_2Si(OCH_2CH_3)_3$,
$Cl^-(CH_3)_2(C_6H_5—CH_2—)N^+CH_2CH_2CH_2Si(OCH_3)_3$,
$Cl^-(CH_3)_2(C_6H_5—CH_2—)N^+CH_2CH_2CH_2Si(OCH_2CH_3)_3$,
$H_2NCH_2CH_2NHCH_2CH_2CH_2Si(OCH_3)_3$,
$H_2NCH_2CH_2NHCH_2CH_2CH_2Si(OCH_2CH_3)_3$,
$H_2NCH_2CH_2NHCH_2CH_2CH_2SiCH_3(OCH_3)_2$,
$H_2NCH_2CH_2NHCH_2CH_2CH_2SiCH_3(OCH_2CH_3)_2$,
$H_2NCH_2CH_2NHCH_2CH_2NHCH_2CH_2CH_2Si(OCH_3)_3$,
$H_2NCH_2CH_2NHCH_2CH_2NHCH_2CH_2CH_2Si(OCH_2CH_3)_3$,
$H_2NCH_2CH_2NHCH_2CH_2NHCH_2CH_2CH_2SiCH_3(OCH_3)_2$,
$H_2NCH_2CH_2NHCH_2CH_2NHCH_2CH_2CH_2SiCH_3(OCH_2CH_3)_2$,

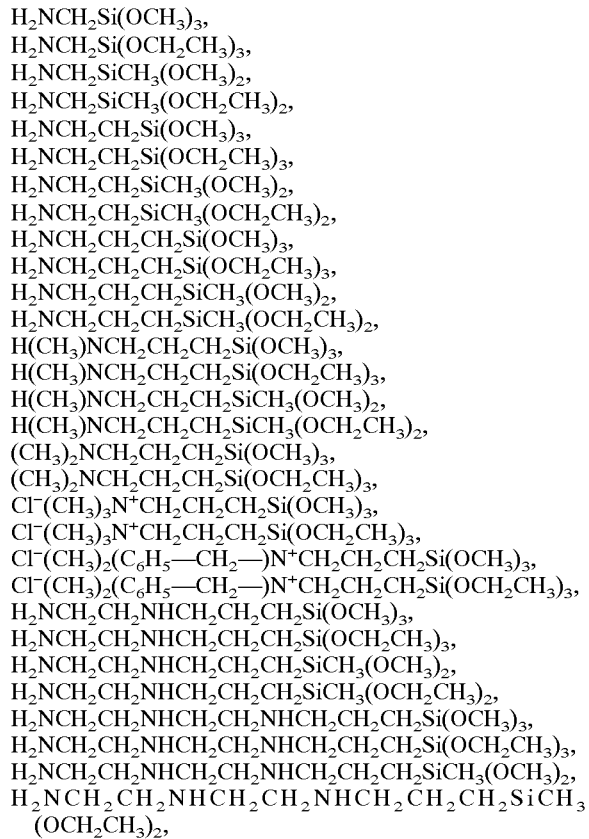

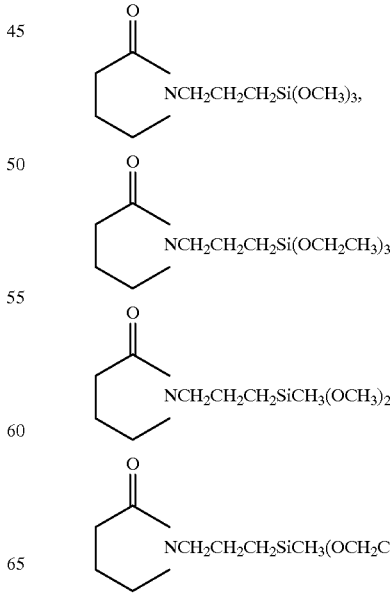

-continued

CH₃OC(=O)—NCH₂CH₂CH₂Si(OCH₃)₃, (with H on N)

CH₃OC(=O)—NCH₂CH₂CH₂Si(OCH₂CH₃)₃, (with H on N)

CH₃OC(=O)—NCH₂CH₂CH₂SiCH₃(OCH₃)₂, (with H on N)

CH₃OC(=O)—NCH₂CH₂CH₂SiCH₃(OCH₂CH₃)₂, (with H on N)

CH₃C(=O)—NCH₂CH₂CH₂Si(OCH₃)₃, (with H on N)

CH₃C(=O)—NCH₂CH₂CH₂Si(OCH₂CH₃)₃, (with H on N)

CH₃C(=O)—NCH₂CH₂CH₂CH₃Si(OCH₃)₃, (with H on N)

CH₃C(=O)—NCH₂CH₂CH₂CH₃Si(OCH₂CH₃)₃ (with H on N)

Of these examples, the following are particularly preferable. They may be used in the form of partial hydrolyzate.

H₂NCH₂CH₂NHCH₂CH₂CH₂Si(OCH₃)₃
H₂NCH₂CH₂NHCH₂CH₂NHCH₂CH₂CH₂Si(OCH₃)₃

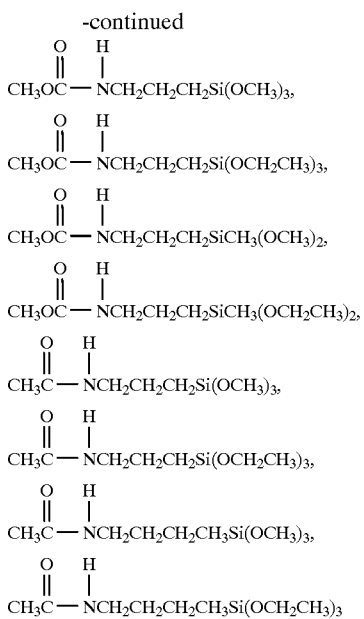

H₂NCH₂CH₂NHCH₂CH₂CH₂Si(OC₂H₅)₃
H₂NCH₂CH₂NHCH₂CH₂NHCH₂CH₂CH₂Si(OC₂H₅)₃

The above-mentioned hydrolyzable silane or partial hydrolyzate thereof (A) is used in combination with another hydrolyzable silane which is represented by the following formula (2) or partial hydrolyzate thereof (B). More than one kind of components (B) may be used.

$$R^3{}_n SiR^4{}_{4-n} \quad (2)$$

wherein $R^3$ is an unsubstituted or substituted monovalent hydrocarbon group having 1 to 8 carbon atoms and not containing a nitrogen atom, $R^4$ is an alkoxyl group or acyloxy group having 1 to 4 carbon atoms, and n is 0, 1, or 2.

The $C_{1-8}$ monovalent hydrocarbon group as $R^3$ is the same as that defined as $R^1$. It is exemplified by —CH₃, —CH₂CH₃, —CH₂CH₂CH₃, —CH(CH₃)₂, —CH₂CH₂CH₂CH₃, —CH(CH₃)CH₂CH₃, —CH₂CH(CH₃)CH₃, —C(CH₃)₃, —C₆H₅ and —C₆H₁₃.

In formula (2), $R^4$ is a $C_{1-4}$ alkoxyl group or acyloxy group, which is exemplified by —OCH₃, —OCH₂CH₃, —OCH₂CH₂CH₃, —OCH(CH₃)₂, —OCH₂CH₂CH₂CH₃, —OCH(CH₃)CH₂CH₃, —OCH₂CH(CH₃)CH₃, —OC(CH₃)₃, —OCOCH₃ and —OCOCH₂CH₃. Letter n is 0, 1, or 2.

Examples of the hydrolyzable silane (B) represented by formula (2) include the following.

Si(OCH₃)₄,
Si(OCH₂CH₃)₄,
Si(OCH₂CH₂CH₃)₄,
Si(OCH₂CH₂CH₂CH₃)₄,
CH₃Si(OCH₃)₃,
CH₃Si(OCH₂CH₃)₃,
CH₃Si(OCH₂CH₂C₃)₃,
CH₃Si(OCH₂CH₂CH₂CH₃)₃,
(CH₃)₂Si(OCH₃)₂,
(CH₃)₂Si(OCH₂CH₃)₂,
(CH₃)₂Si(OCH₂CH₂CH₃)₂,
(CH₃)₂Si(OCH₂CH₂CH₂CH₃)₂,

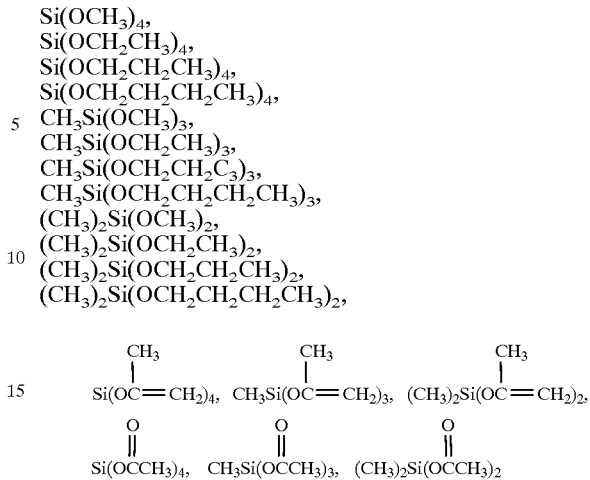

Preferable among these examples are Si(OCH₃)₄, Si(OCH₂CH₃)₄, CH₃Si(OCH₃)₃, and CH₃Si(OCH₂CH₃)₃, and partial hydrolyzate thereof.

The hydrolyzable silane or partial hydrolyzate thereof having a nitrogen-containing organic group (A) is used in combination with the hydrolyzable silane or partial hydrolyzate thereof (B) in a ratio of 100 parts by weight of (A) to 5–200 parts by weight, preferably 10–150 parts by weight of component (B). If the amount of component (B) exceeds 200 parts by weight, the resulting composition is poor in stability under alkaline conditions.

The above-mentioned hydrolyzable silanes or partial hydrolyzate thereof (A) and (B) are hydrolyzed into the organosilicon compound as the main ingredient in the present invention. This hydrolysis is accomplished usually in water. If necessary, water may contain a water-miscible organic solvent, such as alcohol, ester, ketone, and glycol. Examples of the organic solvent include alcohols (such as methyl alcohol, ethyl alcohol, 1-propyl alcohol, and 2-propyl alcohol), esters (such as methyl acetate, ethyl acetate, and ethyl acetoacetate), ketones (such as acetone and methyl ethyl ketone), and glycols (such as glycerin and diethylene glycol).

The amount of the solvent should preferably be 400 to 5,000 parts by weight, more preferably 1,000 to 3,000 parts by weight, for 100 parts by weight of the components (A) and (B). The solvent in an amount less than 400 parts by weight causes the reaction to take place so rapidly that the resulting solution is poor in uniformity and storage stability. The solvent in an amount more than 5,000 parts by weight is economically disadvantageous.

The amount of water in the solvent should be such that the molar ratio of water to silane is 5 to 50. If the amount of water is less than specified above, hydrolysis does not proceed smoothly and the resulting solution is poor in stability. An excess amount of water leads to an economical disadvantage.

Hydrolysis may be accomplished by any of the following four methods.

(1) adding dropwise the mixture of components (A) and (B) to water or an organic solvent containing more water than necessary for hydrolysis.

(2) adding dropwise water to the mixture of components (A) and (B) which may contain an organic solvent.

(3) adding dropwise the silane or partial hydrolyzate thereof (B) to water or an organic solvent containing more water than necessary for hydrolysis, and then adding dropwise the silane or partial hydrolyzate thereof (A) to the resulting solution.

(4) adding dropwise the silane or partial hydrolyzate thereof (A) to water or an organic solvent containing more water than necessary for hydrolysis, and then adding dropwise the silane or partial hydrolyzate thereof (B) to the resulting solution.

The first method (1) is preferable because it gives rise to a stable water-resistant ink composition.

Hydrolysis as mentioned above gives an aqueous solution of organosilicon compound. If necessary, it may be diluted with water or concentrated to remove water so that the amount of water is 10 to 2,000 parts by weight, preferably 10 to 1,000 parts by weight, for 100 parts by weight of the organosilicon compound.

The optimal amount of component (II) varies depending on the kind of component (I) (water soluble dye compound and/or organic pigment compound) used. It is 2 to 60 parts by weight, particularly 10 to 40 parts by weight, for 10 parts by weight of component (I). An amount less than 2 parts by weight is not enough to impart satisfactory water resistance to the ink composition. An amount more than 60 parts by weight is wasted without additional water resistance.

The ink composition of the present invention employs water as component (III), which functions as a solvent for the above-mentioned components (I) and (II).

The amount of water is 30 to 10,000 parts by weight, particularly 40 to 1,000 parts by weight, for 10 parts by weight of component (I). With an amount less than 30 parts by weight, the resulting ink composition is poor in storage stability. With an amount more than 10,000 parts by weight, the resulting ink composition lacks water resistance.

The ink composition of the present invention is composed of the above-mentioned components (I) to (III), and hence it is superior in water resistance, storage stability, ink discharge stability, and color development. It is suitable for ink jet printing that performs recording with aqueous ink. It may be incorporated with a variety of additives according to need.

For example, it may be incorporated with a humectant to prevent nozzle clogging and improve ink delivery stability. Examples of the humectant include glycerin, diethylene glycol, triethylene glycol, low-molecular weight polyethylene glycol, polyvinyl alcohol, ethyl alcohol, and isopropyl alcohol. They may be used alone or in combination with one another.

The amount of the humectant may preferably be 1 to 40 parts by weight, particularly 5 to 30 parts by weight, for 10 parts by weight of component (I). An amount less than 1 part by weight may not be enough to ensure good ink delivery stability. An amount more than 40 parts by weight may have an adverse effect on water resistance and is uneconomical.

The ink composition may be incorporated with optional additives in an amount not harmful to stability. Examples of optional additives include UV absorber, defoaming agent, surface active agent, fine particulate inorganic oxide or sol thereof for reinforcement, and water-soluble polymer.

As mentioned above, the ink composition of the present invention is superior not only in water resistance (after printing) but also in storage stability, ink delivery stability, and color development (of characters and images after printing).

The writing instrument of the present invention contains the aqueous ink to produce characters and images on paper (and other recording medium). Examples of the writing instrument include ball-point pen, sign pen, marker pen, felt pen, and fountain pen. They are the same as conventional ones in the mechanism to hold and deliver ink, except that the conventional aqueous ink is replaced by the ink composition of the present invention.

EXAMPLES

The invention will be described in more detail with reference to the following Examples and Comparative Examples, which are not intended to restrict the scope of the invention.

Synthesis Example 1

A 200-ml reactor equipped with a stirrer, thermometer, and condenser was charged with 120 g (6.67 mol) of water. To the water was added dropwise a mixture of silanes specified below at room temperature over 10 minutes. $H_2NCH_2CH_2NHCH_2CH_2CH_2Si(OCH_3)_3$: 44.4 g (0.2 mol) $Si(OCH_3)_4$: 15.2 g (0.1 mol) The internal temperature rose from 25° C. to 56° C. The reactor was heated to 60–70° C. on an oil bath, and stirring was continued for 1 hour at this temperature. The reactor was provided with an ester adapter. The internal temperature was raised to 98° C. and freed methanol was removed. Thus there was obtained an aqueous solution of organosilicon compound (137 g), which contained 27.3% of nonvolatile matter (105° C./3 hours).

Synthesis Example 2

A 200-ml reactor equipped with a stirrer, thermometer, and condenser was charged with 120 g (6.67 mol) of water. To the water was added dropwise a mixture of silanes specified below at room temperature over 10 minutes. $H_2NCH_2CH_2NHCH_2CH_2CH_2Si(OCH_3)_3$: 33.3 g (0.15 mol) $Si(OCH_3)_4$: 22.8 g (0.15 mol) The internal temperature rose from 25° C. to 53° C. The reactor was heated to 60–70° C. on an oil bath, and stirring was continued for 1 hour at this temperature. The reactor was provided with an ester adapter. The internal temperature was raised to 98° C. and freed methanol was removed. Thus there was obtained an aqueous solution of organosilicon compound (117 g), which contained 27.5% of nonvolatile matter (105° C./3 hours).

Synthesis Example 3

A 200-ml reactor equipped with a stirrer, thermometer, and condenser was charged with 120 g (6.67 mol) of water. To the water was added dropwise a mixture of silanes specified below at room temperature over 10 minutes. $H_2NCH_2CH_2NHCH_2CH_2CH_2Si(OCH_3)_3$: 55.6 g (0.25 mol) $Si(OCH_2CH_3)_4$: 10.4 g (0.05 mol) The internal temperature rose from 27° C. to 49° C. The reactor was heated to 60–70° C. on an oil bath, and stirring was continued for 1 hour at this temperature. The reactor was provided with an ester adapter. The internal temperature was raised to 98° C. and freed methanol and ethanol were removed. Thus there was obtained an aqueous solution of organosilicon compound (137 g), which contained 31.1% of nonvolatile matter (105° C./3 hours).

Synthesis Example 4

A 200-ml reactor equipped with a stirrer, thermometer, and condenser was charged with 120 g (6.67 mol) of water. To the water was added dropwise a mixture of silanes specified below at room temperature over 10 minutes. $H_2NCH_2CH_2NHCH_2CH_2CH_2Si(OCH_3)_3$: 66.6 g (0.30 mol) $CH_3Si(OCH_3)_3$: 4.1 g (0.03 mol) The internal temperature rose from 27° C. to 49° C. The reactor was heated to 60–70° C. on an oil bath, and stirring was continued for 1 hour at this temperature. The reactor was provided with an ester adapter. The internal temperature was raised to 98° C. and freed methanol was removed. Thus there was obtained an aqueous solution of organosilicon compound (149 g), which contained 28.7% of nonvolatile matter (105° C./3 hours).

Synthesis Example 5

A 200-ml reactor equipped with a stirrer, thermometer, and condenser was charged with 120 g (6.67 mol) of water. To the water was added dropwise a mixture of silanes specified below at room temperature over 10 minutes. $H_2NCH_2CH_2NHCH_2CH_2NHCH_2CH_2CH_2Si(OCH_3)_3$: 53.0 g (0.2 mol) $CH_3Si(OCH_3)_3$: 13.6 g (0.1 mol) The internal temperature rose from 27° C. to 55° C. The reactor was heated to 60–70° C. on an oil bath, and stirring was continued for 1 hour at this temperature. The reactor was provided with an ester adapter. The internal temperature was raised to 98° C. and freed methanol and ethanol were removed. Thus there was obtained an aqueous solution of organosilicon compound (151 g), which contained 33.3% of nonvolatile matter (105° C./3 hours).

Synthesis Example 6

A 200-ml reactor equipped with a stirrer, thermometer, and condenser was charged with 120 g (6.67 mol) of water. To the water was added dropwise a mixture of silanes specified below at room temperature over 10 minutes.

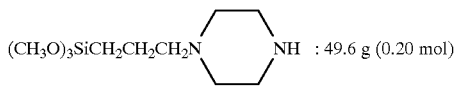

: 49.6 g (0.20 mol)

$CH_3Si(OCH_3)_3$: 13.6 g (0.10 mol) The internal temperature rose from 27° C. to 43° C. The reactor was heated to 60–70° C. on an oil bath, and stirring was continued for 1 hour at this temperature. The reactor was provided with an ester adapter. The internal temperature was raised to 98° C. and freed methanol was removed. Thus there was obtained an aqueous solution of organosilicon compound (131 g), which contained 31.0% of nonvolatile matter (105° C./3 hours).

Synthesis Example 7

A 1-liter reactor equipped with a stirrer, thermometer, and condenser was charged with 228 g (1.5 mol) of $Si(OCH_3)_4$ and 47.7 g of methanol. To the solution was added dropwise 18.0 g of 0.05N hydrochloric acid over 10 minutes. With the reactor ice-cooled, the internal temperature was kept at 10–15° C. for 1 hour and then at room temperature for 6 hours. The reactor was provided with an ester adapter. The internal temperature was raised to 70° C. and methanol was removed. Thus there was obtained an organosilicon compound (220 g), which contained 78.7% of nonvolatile matter (105° C./3 hours).

Example 1

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 1. (18.3 g, solids 5.0 g)
(3) Water (66.7 g)
(4) Glycerin as humectant (10.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 1. (18.3 g, solids 5.0 g)
(3) Water (66.7 g)
(4) Glycerin as humectant (10.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 1. (18.3 g, solids 5.0 g)
(3) Water (66.7 g)
(4) Glycerin as humectant (10.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 1. (18.3 g, solids 5.0 g)
(3) Water (66.7 g)
(4) Glycerin as humectant (10.0 g)

These four ink compositions were used for printing on plain paper by an ink-jet printer (BJC-600S, made by Canon Inc.) The printed characters and images were evaluated in the following manner. The results are shown in Table 1.

Water Resistance

The printed paper was immersed in water and then pulled up, and the characters and images were examined for change and rated as follows.
∘: no run at all.
Δ: slight run.
x: considerable run.

Color Development of Images

The printed characters and images were examined for color development and rated as follows.
∘: good color development.
x: poor color development.

Delivery Stability

After continuous printing for 1 hour, printed characters and images were examined for blurs due to ink nozzle clogging and rated as follows.
∘: no blurs at all.
Δ: partial blurs.
x: considerable blurs.

Storage Stability

The period required for continuous daily printing (30 minutes per day) to become blurred due to nozzle clogging.
Storage Stability at 50° C.

The period required for the ink composition to change (such as discoloration and gelation) after standing at 50° C.

Example 2

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 1. (36.6 g, solids 10.0 g)
(3) Water (48.4 g)
(4) Glycerin as humectant (10.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 1. (36.6 g, solids 10.0 g)
(3) Water (48.4 g)

(4) Glycerin as humectant (10.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 1. (36.6 g, solids 10.0 g)
(3) Water (48.4 g)
(4) Glycerin as humectant (10.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 1. (36.6 g, solids 10.0 g)
(3) Water (48.4 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Example 3

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 1. (73.3 g, solids 20.0 g)
(3) Water (11.7 g)
(4) Glycerin as humectant (10.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 1. (73.3 g, solids 20.0 g)
(3) Water (11.7 g)
(4) Glycerin as humectant (10.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 1. (73.3 g, solids 20.0 g)
(3) Water (11.7 g)
(4) Glycerin as humectant (10.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 1. (73.3 g, solids 20.0 g)
(3) Water (11.7 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Example 4

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 2. (18.1 g, solids 5.0 g)
(3) Water (66.9 g)
(4) Glycerin as humectant (10.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 2. (18.1 g, solids 5.0 g)
(3) Water (66.9 g)
(4) Glycerin as humectant (10.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 2. (18.1 g, solids 5.0 g)
(3) Water (66.9 g)
(4) Glycerin as humectant (10.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 2. (18.1 g, solids 5.0 g)
(3) Water (66.9 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Example 5

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 3. (16.1 g, solids 5.0 g)
(3) Water (66.9 g)
(4) Glycerin as humectant (10.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 3. (16.1 g, solids 5.0 g)
(3) Water (66.9 g)
(4) Glycerin as humectant (10.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 3. (16.1 g, solids 5.0 g)

(3) Water (66.9 g)
(4) Glycerin as humectant (10.0 g)
[Cyan ink]
A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 3. (16.1 g, solids 5.0 g)
(3) Water (66.9 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Example 6

[Black ink]
A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 4. (17.4 g, solids 5.0 g)
(3) Water (66.9 g)
(4) Glycerin as humectant (10.0 g)
[Magenta ink]
A water-resistant ink composition was prepared from the following four components.
(1) Water-soluble dye compound. "Acid red 37" from Aldrich Co., Ltd. (5.0 g)
(2) Organosilicon compound obtained in Synthesis Example 4. (17.4 g, solids 5.0 g)
(3) Water (66.9 g)
(4) Glycerin as humectant (10.0 g)
[Yellow ink]
A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 4. (17.4 g, solids 5.0 g)
(3) Water (66.9 g)
(4) Glycerin as humectant (10.0 g)
[Cyan ink]
A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 4. (17.4 g, solids 5.0 g)
(3) Water (66.9 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Example 7

[Black ink]
A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 5. (15.0 g, solids 5.0 g)
(3) Water (70.0 g)
(4) Glycerin as humectant (10.0 g)
[Magenta ink]
A water-resistant ink composition was prepared from the following four components.
(1) Water-soluble dye compound. "Acid red 37" from Aldrich Co., Ltd. (5.0 g)
(2) Organosilicon compound obtained in Synthesis Example 5. (15.0 g, solids 5.0 g)
(3) Water (70.0 g)
(4) Glycerin as humectant (10.0 g)
[Yellow ink]
A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 5. (15.0 g, solids 5.0 g)
(3) Water (70.0 g)
(4) Glycerin as humectant (10.0 g)
[Cyan ink]
A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 5. (15.0 g, solids 5.0 g)
(3) Water (70.0 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Example 8

[Black ink]
A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 6. (16.1 g, solids 5.0 g)
(3) Water (68.9 g)
(4) Glycerin as humectant (10.0 g)
[Magenta ink]
A water-resistant ink composition was prepared from the following four components.
(1) Water-soluble dye compound. "Acid red 37" from Aldrich Co., Ltd. (5.0 g)
(2) Organosilicon compound obtained in Synthesis Example 6. (16.1 g, solids 5.0 g)
(3) Water (68.9 g)
(4) Glycerin as humectant (10.0 g)
[Yellow ink]
A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 6. (16.1 g, solids 5.0 g)
(3) Water (68.9 g)
(4) Glycerin as humectant (10.0 g)
[Cyan ink]
A water-resistant ink composition was prepared from the following four components.
(1) Water-soluble dye compound. "Direct blue 86" from Tokyo Kasei Co., Ltd. (5.0 g)

(2) Organosilicon compound obtained in Synthesis Example 6. (16.1 g, solids 5.0 g)
(3) Water (68.9 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

Comparative Example 1

Printing was carried out on plain paper by an ink-jet printer (BJC-600S, made by Canon Inc.) with ink attached to the printer. The printed characters and images were evaluated in the same manner as in Example 1. The results are shown in Table 1.

Comparative Example 2

[Black ink]
A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 7. (6.4 g, solids 5.0 g)
(3) Water (79.6 g)
(4) Glycerin as humectant (10.0 g)

[Magenta ink]
A water-resistant ink composition was prepared from the following four components.
(1) Water-soluble dye compound. "Acid red 37" from Aldrich Co., Ltd. (5.0 g)
(2) Organosilicon compound obtained in Synthesis Example 7. (6.4 g, solids 5.0 g)
(3) Water (79.6 g)
(4) Glycerin as humectant (10.0 g)

[Yellow ink]
A water-resistant ink composition was prepared from the following four components.
(1) Water-soluble dye compound. "Acid yellow 23" from Tokyo Kasei Co., Ltd. (4.0 g)
(2) Organosilicon compound obtained in Synthesis Example 7. (6.4 g, solids 5.0 g)
(3) Water (79.6 g)
(4) Glycerin as humectant (10.0 g)

[Cyan ink]
A water-resistant ink composition was prepared from the following four components.
(1) Water-soluble dye compound. "Direct blue 86" from Tokyo Kasei Co., Ltd. (4.0 g)
(2) Organosilicon compound obtained in Synthesis Example 7. (6.4 g, solids 5.0 g)
(3) Water (79.6 g)
(4) Glycerin as humectant (10.0 g)

These four ink compositions were used for printing on plain paper by an ink-jet printer (BJC-600S, made by Canon Inc.) The printed characters and images were evaluated in the same manner as in Example 1. The results are shown in Table 1.

TABLE 1

| | Water resistance | Color development of images | Ink delivery stability | Storage stability (months) | Storage stability at 50° C. (months) |
|---|---|---|---|---|---|
| Example 1 | ○ | ○ | ○ | 6 | 10 |
| Example 2 | ○ | ○ | ○ | 5 | 9 |
| Example 3 | ○ | ○ | ○ | 6 | 10 |
| Example 4 | ○ | ○ | ○ | 6 | 10 |
| Example 5 | ○ | ○ | ○ | 6 | 10 |
| Example 6 | ○ | ○ | ○ | 6 | 10 |
| Example 7 | ○ | ○ | ○ | 6 | 10 |
| Example 8 | ○ | ○ | ○ | 6 | 10 |
| Comparative Example 1 | x | ○ | ○ | 6 | 12 |
| Comparative Example 2 | — | ○ | x clogs soon | — | — |

Example 9

[Black ink]
A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 1. (18.3 g, solids 5.0 g)
(3) Water (70.7 g)
(4) Diethylene glycol as humectant (6.0 g)

[Magenta ink]
A water-resistant ink composition was prepared from the following four components.
(1) Water-soluble dye compound. "Acid red 37" from Aldrich Co., Ltd. (5.0 g)
(2) Organosilicon compound obtained in Synthesis Example 1. (18.3 g, solids 5.0 g)
(3) Water (70.7 g)
(4) Diethylene glycol as humectant (6.0 g)

[Yellow ink]
A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 1. (18.3 g, solids 5.0 g)
(3) Water (70.7 g)
(4) Diethylene glycol as humectant (6.0 g)

[Cyan ink]
A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 1. (18.3 g, solids 5.0 g)
(3) Water (70.7 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 10

[Black ink]
A water-resistant ink composition was prepared from the following four components.
(1) Water-soluble dye compound. "Chlorasol black LF" from Tokyo Kasei Co., Ltd. (5.0 g)

(2) Organosilicon compound obtained in Synthesis Example 1. (36.6 g, solids 10.0 g)
(3) Water (52.4 g)
(4) Diethylene glycol as humectant (6.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 1. (36.6 g, solids 10.0 g)
(3) Water (52.4 g)
(4) Diethylene glycol as humectant (6.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 1. (36.6 g, solids 10.0 g)
(3) Water (52.4 g)
(4) Diethylene glycol as humectant (6.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 1. (36.6 g, solids 10.0 g)
(3) Water (52.4 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 11

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 1. (73.3 g, solids 20.0 g)
(3) Water (15.7 g)
(4) Diethylene glycol as humectant (6.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 1. (73.3 g, solids 20.0 g)
(3) Water (15.7 g)
(4) Diethylene glycol as humectant (6.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 1. (73.3 g, solids 20.0 g)
(3) Water (15.7 g)
(4) Diethylene glycol as humectant (6.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 1. (73.3 g, solids 20.0 g)
(3) Water (15.7 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 12

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 2. (18.1 g, solids 5.0 g)
(3) Water (70.9 g)
(4) Diethylene glycol as humectant (6.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 2. (18.1 g, solids 5.0 g)
(3) Water (70.9 g)
(4) Diethylene glycol as humectant (6.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 2. (18.1 g, solids 5.0 g)
(3) Water (70.9 g)
(4) Diethylene glycol as humectant (6.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 2. (18.1 g, solids 5.0 g)
(3) Water (70.9 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 13

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 3. (16.1 g, solids 5.0 g)
(3) Water (72.9 g)
(4) Diethylene glycol as humectant (6.0 g)

[Magenta ink]

A water-resistant ink composition was prepared from the following four components.

(1) Water-soluble dye compound. "Acid red 37" from Aldrich Co., Ltd. (5.0 g)
(2) Organosilicon compound obtained in Synthesis Example 3. (16.1 g, solids 5.0 g)
(3) Water (72.9 g)
(4) Diethylene glycol as humectant (6.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 3. (16.1 g, solids 5.0 g)
(3) Water (72.9 g)
(4) Diethylene glycol as humectant (6.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 3. (16.1 g, solids 5.0 g)
(3) Water (72.9 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 14

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 4. (17.4 g, solids 5.0 g)
(3) Water (71.6 g)
(4) Diethylene glycol as humectant (6.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 4. (17.4 g, solids 5.0 g)
(3) Water (71.6 g)
(4) Diethylene glycol as humectant (6.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 4. (17.4 g, solids 5.0 g)
(3) Water (71.6 g)
(4) Diethylene glycol as humectant (6.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 4. (17.4 g, solids 5.0 g)
(3) Water (71.6 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 15

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 5. (15.0 g, solids 5.0 g)
(3) Water (74.0 g)
(4) Diethylene glycol as humectant (6.0 g)

[Magenta ink]

A water-resistant ink composition was prepared from the following four components.
(1) Water-soluble dye compound. "Acid red 37" from Aldrich Co., Ltd. (5.0 g)
(2) Organosilicon compound obtained in Synthesis Example 5. (15.0 g, solids 5.0 g)
(3) Water (74.0 g)
(4) Diethylene glycol as humectant (6.0 g)

[Yellow ink]

A water-resistant ink composition was prepared from the following four components.
(1) Water-soluble dye compound. "Acid yellow 23" from Tokyo Kasei Co., Ltd. (5.0 g)
(2) Organosilicon compound obtained in Synthesis Example 5. (15.0 g, solids 5.0 g)
(3) Water (74.0 g)
(4) Diethylene glycol as humectant (6.0 g)

[Cyan ink]

A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 5. (15.0 g, solids 5.0 g)
(3) Water (74.0 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Example 16

[Black ink]

A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 6. (16.1 g, solids 5.0 g)
(3) Water (72.9 g)
(4) Diethylene glycol as humectant (6.0 g)

[Magenta ink]

A water-resistant ink composition was prepared from the following four components.
(1) Water-soluble dye compound. "Acid red 37" from Aldrich 5 Co., Ltd. (5.0 g)
(2) Organosilicon compound obtained in Synthesis Example 6. (16.1 g, solids 5.0 g)
(3) Water (72.9 g)
(4) Diethylene glycol as humectant (6.0 g)

[Yellow ink]

A water-resistant ink composition was prepared from the following four components.

(1) Water-soluble dye compound. "Acid yellow 23" from Tokyo Kasei Co., Ltd. (5.0 g)
(2) Organosilicon compound obtained in Synthesis Example 6. (16.1 g, solids 5.0 g)
(3) Water (72.9 g)
(4) Diethylene glycol as humectant (6.0 g)
[Cyan ink]
A water-resistant ink composition was prepared from the following four components.
(1) Water-soluble dye compound. "Direct blue 86" from Tokyo Kasei Co., Ltd. (5.0 g)
(2) Organosilicon compound obtained in Synthesis Example 6. (16.1 g, solids 5.0 g)
(3) Water (72.9 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

Comparative Example 3

Printing was carried out on plain paper by an ink-jet printer (MJ-500C, made by Epson Co., Ltd.) with ink attached to the printer. The printed characters and images were evaluated in the same manner as in Example 1. The results are shown in Table 2.

Comparative Example 4
[Black ink]
A water-resistant ink composition was prepared from the following four components.
(1) Water-soluble dye compound. "Chlorasol black LF" from Tokyo Kasei Co., Ltd. (5.0 g)
(2) Organosilicon compound obtained in Synthesis Example 7. (6.4 g, solids 5.0 g)
(3) Water (82.6 g)
(4) Diethylene glycol as humectant (6.0 g)
[Magenta ink]
A water-resistant ink composition was prepared from the following four components.
(1) Water-soluble dye compound. "Acid red 37" from Aldrich Co., Ltd. (5.0 g)
(2) Organosilicon compound obtained in Synthesis Example 7. (6.4 g, solids 5.0 g)
(3) Water (82.6 g)
(4) Diethylene glycol as humectant (6.0 g)
[Yellow ink]
A water-resistant ink composition was prepared from the following four components.
(1) Water-soluble dye compound. "Acid yellow 23" from Tokyo Kasei.Co., Ltd. (4.0 g)
(2) Organosilicon compound obtained in Synthesis Example 7. (6.4 g, solids 5.0 g)
(3) Water (82.6 g)
(4) Diethylene glycol as humectant (6.0 g)
[Cyan ink]
A water-resistant ink composition was prepared from the following four components.
(1) Water-soluble dye compound. "Direct blue 86" from Tokyo Kasei Co., Ltd. (4.0 g)
(2) Organosilicon compound obtained in Synthesis Example 7. (6.4 g, solids 5.0 g)
(3) Water (82.6 g)
(4) Diethylene glycol as humectant (6.0 g)

These four ink compositions were used for printing on plain paper by an ink-jet printer (MJ-500C, made by Epson Co., Ltd.) The printed characters and images were evaluated in the same manner as in Example 1. The results are shown in Table 2.

TABLE 2

| | Water resistance | Color development of images | Ink delivery stability | Storage stability (months) | Storage stability at 50° C. (months) |
|---|---|---|---|---|---|
| Example 9 | ○ | ○ | ○ | 8 | 12 |
| Example 10 | ○ | ○ | ○ | 7 | 10 |
| Example 11 | ○ | ○ | ○ | 8 | 12 |
| Example 12 | ○ | ○ | ○ | 8 | 12 |
| Example 13 | ○ | ○ | ○ | 8 | 12 |
| Example 14 | ○ | ○ | ○ | 8 | 12 |
| Example 15 | ○ | ○ | ○ | 8 | 12 |
| Example 16 | ○ | ○ | ○ | 8 | 12 |
| Comparative Example 3 | x | ○ | ○ | 12 | 12 |
| Comparative Example 4 | — | ○ | x clogs soon | — | — |

It is noted from the foregoing that the water-resistant ink composition of the present invention gives printed characters and images superior in water resistance and color development and also excels in storage stability and ink delivery stability. Therefore, it is suitable for ink-jet printers.

Example 17
[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 1. (18.3 g, solids 5.0 g)
(3) Water (76.7 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 1. (18.3 g, solids 5.0 g)
(3) Water (76.7 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 1. (18.3 g, solids 5.0 g)
(3) Water (76.7 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 1. (18.3 g, solids 5.0 g)
(3) Water (76.7 g)

These four ink compositions were used for writing on plain paper by a fine pen. The written characters and images were evaluated in the following manner. The results are shown in Table 3.
Water Resistance
The written paper was wetted with water placed thereon, and the characters and images were examined for change and rated as follows.

○: no change.
Δ: slight run.
x: considerable run.
Color Development and Discoloration of Images The written characters and images were examined for color development and discoloration with reference to blank (water containing the above-mentioned dyes) and rated as follows.
○: good color development without discoloration.
x: poor color development with discoloration.
Storage Stability at 50° C.

The period required for the ink composition to change (such as discoloration and gelation) after standing at 50° C.

Example 18

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 1. (36.6 g, solids 10.0 g)
(3) Water (58.4 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 1. (36.6 g, solids 10.0 g)
(3) Water (58.4 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 1. (36.6 g, solids 10.0 g)
(3) Water (58.4 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 1. (36.6 g, solids 10.0 g)
(3) Water (58.4 g)

These four ink compositions were used for writing on plain paper by a fine pen. The written characters and images were evaluated in the same manner as in Example 17. The results are shown in Table 3.

Example 19

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 1. (73.3 g, solids 20.0 g)
(3) Water (21.7 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 1. (73.3 g, solids 20.0 g)
(3) Water (21.7 g)
[Yellow ink]
A water-resistant ink composition was prepared from the following three components.
(1) Water-soluble dye compound. "Acid yellow 23" from Tokyo Kasei Co., Ltd. (5.0 g)
(2) organosilicon compound obtained in Synthesis Example 1. (73.3 g, solids 20.0 g)
(3) Water (21.7 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 1. (73.3 g, solids 20.0 g)
(3) Water (21.7 g)

These four ink compositions were used for writing on plain paper by a fine pen. The written characters and images were evaluated in the same manner as in Example 17. The results are shown in Table 3.

Example 20

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 2. (18.1 g, solids 5.0 g)
(3) Water (76.9 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 2. (18.1 g, solids 5.0 g)
(3) Water (76.9 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 2. (18.1 g, solids 5.0 g)
(3) Water (76.9 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 2. (18.1. g, solids 5.0 g)
(3) Water (76.9 g)

These four ink compositions were used for writing on plain paper by a fine pen. The written characters and images were evaluated in the same manner as in Example 17. The results are shown in Table 3.

Example 21

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 3. (16.1 g, solids 5.0 g)

(3) Water (78.9 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 3. (16.1 g, solids 5.0 g)
(3) Water (78.9 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 3. (16.1 g, solids 5.0 g)
(3) Water (78.9 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 3. (16.1 g, solids 5.0 g)
(3) Water (78.9 g)

These four ink compositions were used for writing on plain paper by a fine pen. The written characters and images were evaluated in the same manner as in Example 17. The results are shown in Table 3.

Example 22

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 4. (17.4 g, solids 5.0 g)
(3) Water (77.6 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 4. (17.4 g, solids 5.0 g)
(3) Water (77.6 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 4. (17.4 g, solids 5.0 g)
(3) Water (77.6 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 4. (17.4 g, solids 5.0 g)
(3) Water (77.6 g)

These four ink compositions were used for writing on plain paper by a fine pen. The written characters and images were evaluated in the same manner as in Example 17. The results are shown in Table 3.

Example 23

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 5. (18.5 g, solids 5.0 g)
(3) Water (76.5 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 5. (18.5 g, solids 5.0 g)
(3) Water (76.5 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 5. (18.5 g, solids 5.0 g)
(3) Water (76.5 g)
[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 5. (18.5 g, solids 5.0 g)
(3) Water (76.5 g)

These four ink compositions were used for writing on plain paper by a fine pen. The written characters and images were evaluated in the same manner as in Example 17. The results are shown in Table 3.

Example 24

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 6. (16.1 g, solids 5.0 g)
(3) Water (78.9 g)
[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 6. (16.1 g, solids 5.0 g)
(3) Water (78.9 g)
[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 6. (16.1 g, solids 5.0 g)
(3) Water (78.9 g)
[Blue ink]
A water-resistant ink composition was prepared from the following three components.
(1) Water-soluble dye compound. "Direct blue 86" from Tokyo Kasei Co., Ltd. (5.0 g)

(2) Organosilicon compound obtained in Synthesis Example 6. (16.1 g, solids 5.0 g)
(3) Water (78.9 g)

These four ink compositions were used for writing on plain paper by a fine pen. The written characters and images were evaluated in the same manner as in Example 17. The results are shown in Table 3.

Comparative Example 5

[Black ink]
A water-resistant ink composition was prepared from the following two components.
(1) Water-soluble dye compound. "Chlorasol black LF" from Tokyo Kasei Co., Ltd. (5.0 g)
(2) Water (95.0 g)

[Red ink]
A water-resistant ink composition was prepared from the following two components.
(1) Water-soluble dye compound. "Acid red 37" from Aldrich Co., Ltd. (5.0 g)
(2) Water (95.0 g)

[Yellow ink]
A water-resistant ink composition was prepared from the following two components.
(1) Water-soluble dye compound. "Acid yellow 23" from Tokyo Kasei Co., Ltd. (5.0 g)
(2) Water (95.0 g)

[Blue ink]
A water-resistant ink composition was prepared from the following two components.
(1) Water-soluble dye compound. "Direct blue 86" from Tokyo Kasei Co., Ltd. (5.0 g)
(2) Water (95.0 g)

These four ink compositions were used for writing on plain paper by a fine pen. The written characters and images were evaluated in the same manner as in Example 17. The results are shown in Table 3.

Comparative Example 6

[Black ink]
A water-resistant ink composition was prepared from the following three components.
(1) Water-soluble dye compound. "Chlorasol black LF" from Tokyo Kasei Co., Ltd. (5.0 g)
(2) Organosilicon compound obtained in Synthesis Example 7. (6.4 g, solids 5.0 g)
(3) Water (88.6 g)

[Red ink]
A water-resistant ink composition was prepared from the following three components.
(1) Water-soluble dye compound. "Acid red 37" from Aldrich Co., Ltd. (5.0 g)
(2) Organosilicon compound obtained in Synthesis Example 7. (6.4 g, solids 5.0 g)
(3) Water (88.6 g)

[Yellow ink]
A water-resistant ink composition was prepared from the following three components.
(1) Water-soluble dye compound. "Acid yellow 23" from Tokyo Kasei Co., Ltd. (5.0 g)
(2) Organosilicon compound obtained in Synthesis Example 7. (6.4 g, solids 5.0 g)
(3) Water (88.6 g)

[Blue ink]
A water-resistant ink composition was prepared from the following three components.
(1) Water-soluble dye compound. "Direct blue 86" from Tokyo Kasei Co., Ltd. (5.0 g)
(2) Organosilicon compound obtained in Synthesis Example 7. (6.4 g, solids 5.0 g)
(3) Water (88.6 g)

These four ink compositions were used for writing on plain paper by a fine pen. The written characters and images were evaluated in the same manner as in Example 17. The results are shown in Table 3.

TABLE 3

| | Water resistance | Color development (or discoloration) of images | Storage stability at 50° C. months |
|---|---|---|---|
| Example 17 | o | o | 10 |
| Example 18 | o | o | 9 |
| Example 19 | o | o | 10 |
| Example 20 | o | o | 10 |
| Example 21 | o | o | 10 |
| Example 22 | o | o | 10 |
| Example 23 | o | o | 10 |
| Example 24 | o | o | 10 |
| Comparative Example 5 | x | o | ≧10 |
| Comparative Example 6 | — | — | gelled soon |

Example 25

A water-resistant ink composition was prepared from the following two components.
(1) Brilliant black ink for fountain pens from Pelican Co., Ltd. (non-volatile matter=4.55% (105° C., 3 hours), pH=8.92) . . . 10 g
(2) Organosilicon compound prepared in Synthesis Example 1. . . . 1.66 g (solids 4.5 g)

The resulting ink was charged into a fountain pen for writing on ordinary paper. The written characters were evaluated in the following manner. The results are shown in Table 4.

Water Resistance

The written paper was wetted with water placed thereon, and the characters and images were examined for change and rated as follows.
o: no change.
Δ: slight run.
x: considerable run.

Color Development and Discoloration of Images

The written characters and images were examined for color development and discoloration with reference to blank (without organosilicon compound) and rated as follows.
o: good color development without discoloration.
x: poor color development with discoloration.

Storage Stability

The period required for the ink-filled fountain pen to become clogged after standing at room temperature.

Storage Stability at 50° C.

The period required for the ink composition to change (such as discoloration and gelation) after standing at 50° C.

Example 26

A water-resistant ink composition was prepared from the following two components.
(1) Brilliant black ink for fountain pens from Mont Blanc Co., Ltd. (non-volatile matter=4.12% (105° C., 3 hours), pH=4.12) . . . 10 g
(2) Organosilicon compound prepared in Synthesis Example 1. . . . 1.51 g (solids 4.1 g)

The resulting ink was charged into a fountain pen for writing on ordinary paper. The written characters were evaluated in the same manner as in Example 25. The results are shown in Table 4.

Comparative Example 7

Brilliant black ink (from Pelican) was charged alone into a fountain pen for writing on ordinary paper. The same test as Example 25 was performed. The results are shown in Table 4.

Comparative Example 8

Brilliant black ink (from Mont Blanc) was charged alone into a fountain pen for writing on ordinary paper. The same test as in Example 25 was performed. The results are shown in Table 4.

TABLE 4

| | Water resistance | Color development (or discoloration) of images | Storage stability | Storage stability at 50° C. |
|---|---|---|---|---|
| Example 25 | o | o | longer than 1 year | 8 months |
| Example 26 | o | o | longer than 1 year | 8 months |
| Comparative Example 7 | x | o | longer than 1 year | longer than 1 year |
| Comparative Example 8 | x | o | longer than 1 year | longer than 1 year |

Example 27

A water-resistant ink composition was prepared from the following two components.
(1) Black aqueous ink for ball-point pens from Pilot Co., Ltd. (non-volatile matter=17.8% (105° C., 3 hours), pH=8.60) . . . 2 g
(2) Organosilicon compound prepared in Synthesis Example 1. . . . 0.38 g (solids 0.1 g)

The resulting ink was charged into a ball-point pen for writing on ordinary paper. The written characters were evaluated in the following manner. The results are shown in Table 5.

Water Resistance

The written paper was wetted with water placed thereon, and the characters and images were examined for change and rated as follows.
o: no change.
Δ: slight run.
x: considerable run.

Color Development and Discoloration of Images

The written characters and images were examined for color development and discoloration with reference to blank (without organosilicon compound) and rated as follows.
o: good color development without discoloration.
x: poor color development with discoloration.

Storage Stability

The period required for the ink-filled ball-point pen to become clogged after standing at room temperature.

Storage Stability at 50° C.

The period required for the ink composition to change (such as discoloration and gelation) after standing at 50° C.

Example 28

A water-resistant ink composition was prepared from the following two components.
(1) Red aqueous ink for ball-point pens from Pilot Co., Ltd. (non-volatile matter=25.7% (105° C., 3 hours), pH=8.79) . . . 2 g
(2) Organosilicon compound prepared in Synthesis Example 1. . . . 0.52 g (solids 0.1 g)

The resulting ink was charged into a ball-point pen for writing on ordinary paper. The same test as in Example 27 was performed. The results are shown in Table 5.

Comparative Example 9

Black aqueous ink for ball-point pens (from Pilot) was charged alone into a ball-point pen for writing on ordinary paper. The same test as in Example 27 was performed. The results are shown in Table 5.

Comparative Example 10

Red aqueous ink for ball-point pens (from Pilot) was charged alone into a ball-point pen for writing on ordinary paper. The same test as in Example 27 was performed. The results are shown in Table 5.

TABLE 5

| | Water resistance | Color development (or discoloration) of images | Storage stability | Storage stability at 50° C. |
|---|---|---|---|---|
| Example 27 | o | o | longer than 1 year | 10 months |
| Example 28 | o | o | longer than 1 year | 10 months |
| Comparative Example 9 | x | o | longer than 1 year | longer than 1 year |
| Comparative Example 10 | x | o | longer than 1 year | longer than 1 year |

Example 29

A water-resistant ink composition was prepared from the following two components.
(1) China ink (black writing fluid) from Fuekinori Co., Ltd. (non-volatile matter=16.6% (105° C., 3 hours), pH=5.83) . . . 10 g
(2) Organosilicon compound prepared in Synthesis Example 1. . . . 1.88 g (solids 0.7 g)

The resulting ink was used for writing on ordinary paper by a fine writing brush. The written characters were evaluated in the following manner. The results are shown in Table 6.

Water Resistance

The written paper was wetted with water placed thereon, and the characters and images were examined for change and rated as follows.
o: no change.
Δ: slight run.
x: considerable run.

Color Development and Discoloration of Images

The written characters and images were examined for color development and discoloration with reference to blank (without organosilicon compound) and rated as follows.
o: good color development without discoloration.
x: poor color development with discoloration.

Storage Stability at 50° C.

The period required for the ink composition to change (such as discoloration and gelation) after standing at 50° C.

Comparative Example 11

China ink (from Fuekinori) was used alone for writing on plain paper. The same test as in Example 29 was performed. The results are shown in Table 6.

TABLE 6

|  | Water resistance | Color development (or discoloration) of images | Storage stability at 50° C. |
|---|---|---|---|
| Example 29 | ○ | ○ | 10 months |
| Comparative Example 11 | Δ | ○ | longer than 1 year |

It is noted from the foregoing that the writing instrument of the present invention gives characters and images which exhibit good water resistance immediately after writing and that the ink is superior in storage stability and safety.

We claim:

1. A water-resistant ink composition comprising:
   (I) 10 parts by weight of a water-soluble dye compound and/or organic pigment compound;
   (II) 2 to 60 parts by weight of an organosilicon compound which is obtained from a mixture of components (A) and (B) shown below by hydrolysis in water or in an organic solvent containing more water than necessary for hydrolysis,
      (A) 100 parts by weight of a hydrolyzable silane having a nitrogen-containing organic group represented by the following formula (1):

$$YR^1_m SiR^2_{3-m} \quad (1)$$

wherein $R^1$ is a $C_{1-8}$ unsubstituted or substituted monovalent hydrocarbon group containing no nitrogen atom, $R^2$ is a $C_{1-4}$ alkoxyl group or acyloxy group, Y is a nitrogen-containing organic group, and m is 0 or 1, or a partial hydrolyzate thereof and
      (B) 5 to 200 parts by weight of a hydrolyzable silane represented by the following formula (2):

$$R^3_n SiR^4_{4-n} \quad (2)$$

wherein $R^3$ is a $C_{1-8}$ unsubstituted or substituted monovalent hydrocarbon group containing no nitrogen atom, $R^4$ is a $C_{1-4}$ alkoxyl group or acyloxy group, and n is 0, 1, or 2, or a partial hydrolyzate thereof, and
   (III) 30 to 10,000 parts by weight of water.

2. The water-resistant ink composition as defined in claim 1, wherein the hydrolyzable silane (A) is selected from the group consisting of:

$H_2NCH_2CH_2NHCH_2CH_2CH_2Si(OCH_3)_3$, $H_2NCH_2CH_2NHCH_2CH_2NHCH_2CH_2CH_2Si(OCH_3)_3$,

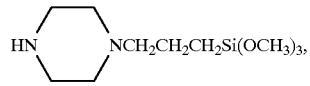

$H_2NCH_2CH_2NHCH_2CH_2CH_2Si(OC_2H_5)_3$, $H_2NCH_2CH_2NHCH_2CH_2NHCH_2CH_2CH_2Si(OC_2H_5)_3$ and

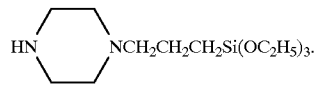

3. The water-resistant ink composition as defined in claim 1, wherein the hydrolyzable silane (B) is selected from the group consisting of:

$Si(OCH_3)_4$, $Si(OC_2H_5)_4$, $CH_3Si(OCH_3)_3$, and $CH_3Si(OC_2H_5)_3$.

4. The water-resistant ink composition as defined in claim 1, which further comprises 1 to 40 parts by weight of humectant.

5. The water-resistant ink composition as defined in claim 1, which is designed for ink-jet recording.

6. A writing instrument comprising an aqueous ink "composition wherein said aqueous ink comprises" the water-resistant ink composition as defined in claim 1.

* * * * *